Figure 1:
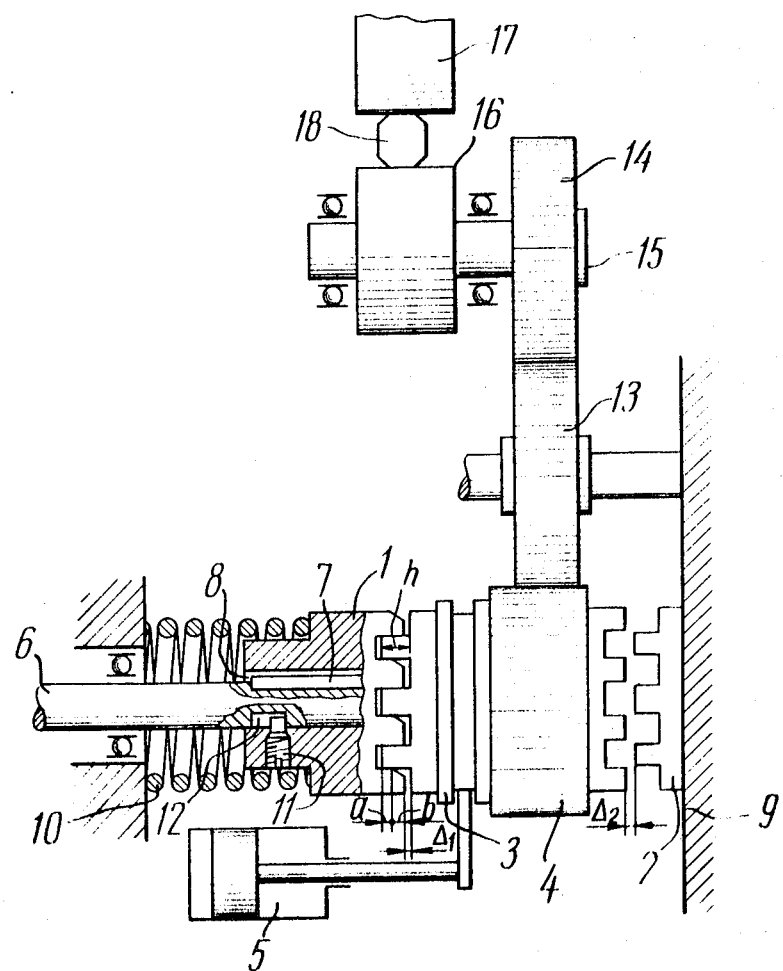

United States Patent

[11] 3,602,345

[72] Inventors Vadim Nikolaevich Rattenberg
ulitsa Sedova, korpus I, kv. 31, Moscow;
Alexei Viktorovich Novikov, Balkhash
Karagandinskaya oblast, ulitsa Lenina, 35,
kv. 6, Balkhash; Georgy Ivanovich
Glushkov, ulitsa Gilyarovskogo, kv. 175,
Moscow; Lev Petrovich Fridman,
Balkhash, Karagandinskay blast, ulitsa
Frunze, 13, kv. 16, Balkhash; Igor
Ignatievich Kurgansky, Khmelnitsky, ulitsa
rnopolskaya, 18, kv. 47, Khmelnitsky;
Khalil Nureevich Tazetdinov, Balkhash
Karagandinskaya oblast, ulitsa Frunze, 13,
kv. 26, Balkhash, all of, U.S.S.R.
[21] Appl. No. 847,599
[22] Filed Aug. 5, 1969
[45] Patented Aug. 31, 1971

[54] JAW CLUTCH
2 Claims, 2 Drawing Figs.
[52] U.S. Cl. ................................................. 192/18 A,
192/67 R, 192/108
[51] Int. Cl. ..................................................... F16d 13/22,
F16d 67/04
[50] Field of Search ........................................ 192/18, 18
A, 18 B, 67 R, 148, 149, 108

[56] References Cited
UNITED STATES PATENTS
| | | | |
|---|---|---|---|
| 2,519,695 | 8/1950 | Olsson et al. ................. | 192/18 (.2) |
| 2,787,355 | 4/1957 | Dodge .......................... | 192/18 (X) |
| 2,908,188 | 10/1959 | Maybarduk .................. | 192/18 (X) |

Primary Examiner—Allan D. Herrmann
Attorney—Holman & Stern

ABSTRACT: A jaw clutch comprising two clutch members and a bushing with jaws at both ends, engaging each of said clutch members, one of which clutch members is mounted on the shaft with a provision for moving along the shaft axis and is constantly pressed by a resilient element against the jaw bushing so that the total axial clearance between the jaws of the bushing and those of the clutch members is smaller than the height of each clutch member jaw at the side of the resilient element.

In addition, each jaw of the clutch member at the side of the resilient element has a straight portion and a portion beveled towards the face end.

JAW CLUTCH

The present invention relates to couplings and more specifically it relates to jaw clutches.

Widely known in prior art are the jaw clutches comprising two jaw-type clutch members rigidly mounted on shafts, and a jaw bushing engaging said clutch members. These clutches are intended to transmit torque from the driving shaft to the driven shaft, the latter being drivingly coupled with the jaw bushing.

However, these clutches cannot be employed in load-hoisting machines in which the jaw bushing is drivingly linked via the driven shaft with the load being handled, since at the moment when the jaw bushing disengages one clutch member and engages the other one, the kinematic linkage between the bushing and the clutch members is broken because of the constant clearance between them, which may lead to dropping of the load and to an accident.

An object of the present invention resides in eliminating the aforesaid disadvantage.

The main object of the invention is to provide a jaw clutch wherein one of its members is so designed and arranged with relation to said bushing as to prevent accidental dropping of the conveyed loads and thus to allow the clutch to be used in load-hoisting machines.

This object is achieved by providing a jaw clutch comprised of two shaft-mounted jaw-type clutch members and a jaw bushing with jaws at both ends engaging said clutch members wherein, according to the invention, one of the clutch members is installed on the shaft with a provision for moving axially over said shaft and is constantly pressed by a resilient element against the jaw bushing so that the summary axial clearance between the jaws of the bushing and those of the clutch members would be smaller than the height of each jaw of the clutch member at the side of the resilient element, each jaw of this clutch member consisting of a straight portion along its height, and a beveled portion directed to the face end.

This installation on the shaft of one of the clutch members guarantees a constant engagement of the jaw bushing with at least one of the clutch members.

It is preferred that the height of the straight portion of each jaw of the bushing or clutch member be smaller, and the total height of the jaw be larger, than the total axial clearance between the jaws.

The provision of the straight and beveled portions on the clutch member jaws as well as the relation between the height of the straight portion of the jaws, their total height and the total axial clearance between the jaws ensure an axial movement of the clutch member towards the resilient element until a complete engagement of the jaws is secured.

Figure 2:
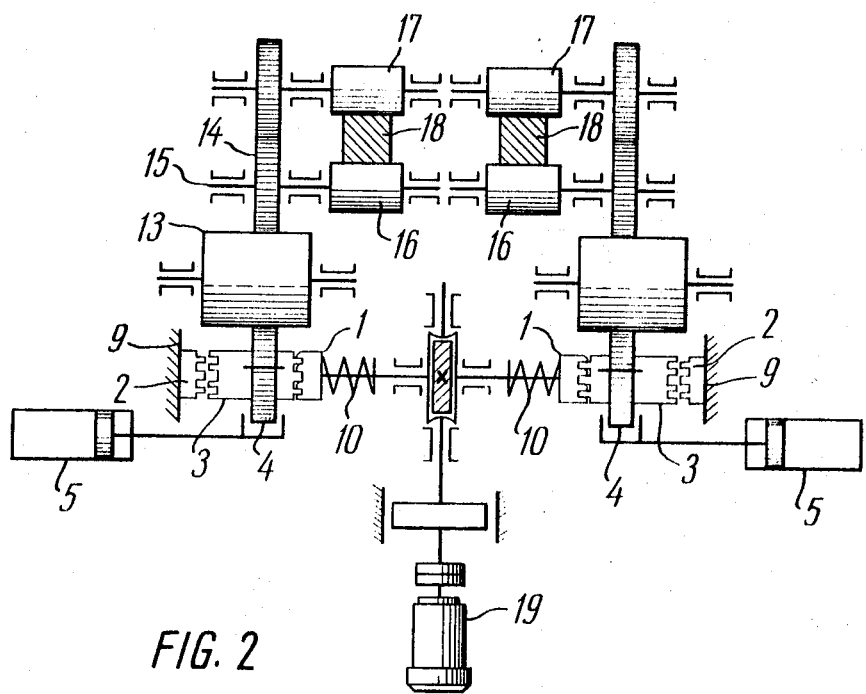

Now the invention will be described in detail by way of example with reference to the accompanying drawings in which:

FIG. 1 is a schematic view of a jaw clutch, according to the invention, partly broken away for illustrative clarity; and FIG. 2 is a diagram showing the connection of the drive to the pulling rolls on a continuous copper-casting plants by means of jaw clutches according to this invention.

The jaw clutch comprises clutch members 1 and 2 (FIG. 1) and a jaw bushing 3 having jaws at both ends and a toothed rim 4 on the outer surface thereof.

The bushing 3 is engaged with the clutch members 1 and 2 by means of a hydraulic cylinder 5. The rotating clutch member 1 has a longitudinal slot or keyway 8 and is installed on the drive shaft 6 with a provision for axial movement over a key 7 received within the slot 8, whereas the stationary clutch member 2 is rigidly mounted on a support 9.

The clutch member 1 is normally biased toward the jaw bushing 3 by a resilient element 10 in the form of a spring.

This urging of the clutch member 1 toward the bushing 3 is limited by a pin 11 secured in the clutch member 1 and entering a longitudinal slot 12 in the shaft 6.

The clutch member 1 is pressed against the bushing 3 so that the total axial clearance $\Delta$ between the jaws of the clutch members 1, 2 and the jaw bushing 3 is smaller than the height $h$ of the jaw of the clutch member, 1 whereby the jaw bushing will at all times be engaged with at least one of the clutch members 1 and/or 2.

Thus, we have the following relation $$\Delta = \Delta_1 + \Delta_2 < h$$

where $\Delta_1$ is the clearance between the jaws of the clutch member 1 and those of the bushing 3;

$\Delta_2$ is the clearance between the jaws of the clutch member 2 and those of the bushing 3.

Each jaw of the clutch member 1 has a straight portion "$a$" along a portion of its height and a beveled portion "$b$," that is, $h = a + b > \Delta; a < \Delta$ Thus, the height "$a$" of the straight portion of each jaw of the clutch member 1 is smaller, and the total height $h$ of the jaw is larger, than the total axial clearance $\Delta$ between the jaws of the bushing 3 and those of the clutch members 1 and 2.

In a preferred embodiment of the invention the toothed rim 4 is operatively connected by the gears 13 and 14 to the shaft 15 which has rigidly mounted thereon a pulling or drawing roll 16 against which the ingot 18 pulled out of the crystallizing tank (not shown) is pressed by the roll 17.

The use of the cooperating jaw clutch is shown with greater detail in FIG. 2 in a multigroove continuous copper casting plant where the clutches are intended for coupling the, centralized drive means 19 with each pair of pulling rolls 16 and 17.

According to the invention the jaw clutch functions as follows:

Assuming that the jaw bushing 3 is initially engaged with the stationary clutch member 2 and hence retained against rotation, the rotating clutch member 1 will be free for rotation relative thereto, due to the clearance provided between the jaw teeth of the clutch member 1 and those of the jaw bushing 3. If it is then desired to engage the rotating clutch member 1 with the jaw bushing 3 to drive the latter, the hydraulic cylinder 5 is activated and shifts the jaw bushing 3 axially towards the left, as seen in FIG. 1.

It should be appreciated that, depending upon the axial position of the jaw bushing 3, three operative conditions or relationships will exist. Firstly, as described above, there is a first or starting position wherein the jaw bushing 3 is engaged with the second clutch member 2 and disengaged from the first clutch member 1. When the jaw bushing is moved to the left a distance corresponding to $\Delta_2$, a second or intermediate position is reached wherein the jaw bushing would normally be engaged with both of the clutch members 1 and 2. However, since this jaw bushing is still retained against rotation by the second clutch member 2, the rotating first clutch member 1 will have its bevelled portions "$b$" ride over the teeth of the jaw bushing in camlike manner and thus will be shifted away from the jaw bushing 3 against the influence of the spring 10 while continuing to rotate. Finally, upon further axial shifting of the jaw bushing 3, it will become fully disengaged from the stationary clutch member 2 and thus free to rotate under the influence of the rotating clutch member 1. As soon as the jaws of the bushing 3 disengage from the jaws of the clutch member 2, the bushing, depending on the weight of the ingot 18, either stays immovable (if the ingot is not heavy or jammed up) or tends to turn in the direction of rotation of the clutch member 1 (if the ingot 18 is heavy). The rotational speed of the bushing 3 cannot be greater than that of the clutch member 1 because in such case the jaws of the bushing 3 will contact the straight portion of the jaw of the clutch member 1. As the bushing 3 is moved further by the hydraulic cylinder 5, its jaws will engage the jaws of the clutch member 1 and transmit the torque from the shaft 6 to the roll 16 via the toothed rim 4 and the gears 13 and 14.

For stopping the ingot and locking same against movement, the jaw bushing 3 must be shifted by the hydraulic cylinder 5 towards the fixed clutch member 2. In this case the bushing 3 will continue transmitting the torque to the shaft 15 until its jaws ride over the beveled portion "b" of the jaws of the clutch member 1. Then, when the jaws of the bushing 3 interact with the beveled portion "b" of the jaws of the clutch member 1, the latter will be pushed away from the bushing 3, the transmission of the torque will cease and the jaws of the bushing 3 will engage their counterparts on the fixed clutch member 2, in the reverse manner of the operation previously described.

The industrial testing of the invention has proven its advantages. In particular, in the event that it is used as a lifting and/or lowering device, freewheeling of the jaw bushing 3 is effectively prevented, since it is maintained at all times in engagement with as least one of the clutch members 1 and 2.

We claim:

1. A jaw clutch comprising a shaft, a jaw bushing mounted on said shaft and adapted for rotation relative thereto, said jaw bushing having a plurality of jaws at each end thereof; a pair of clutch members each having jaws respectively adapted to selectively engage the jaws at the opposite ends of said jaw bushing, one of said clutch members being mounted on said shaft for rotation therewith and the other of said clutch members being stationary, and a resilient member biasing said one of said clutch members into engagement with said jaw bushing, each jaw of said one of said clutch members and of said bushing having a straight portion along its axial height and a beveled portion towards its free end, the total clearance between the jaws of said jaw bushing and of each of said clutch members being less than the axial height of each jaw of said one of said clutch members.

2. A jaw clutch as defined in claim 1 wherein the axial height of the straight portion of each of said jaws is less than said total clearance, and the total axial height of each of said jaws is greater than said total clearance.